United States Patent [19]

Swindells et al.

[11] 4,251,503
[45] Feb. 17, 1981

[54] EFFICIENCY CONTROL SYSTEM FOR CHLORINE DIOXIDE PLANTS

[75] Inventors: Richard Swindells, Caledon; Gerald Cowley, Mississauga, both of Canada

[73] Assignee: ERCO Industries Limited, Islington, Canada

[21] Appl. No.: 75,098

[22] Filed: Sep. 13, 1979

[30] Foreign Application Priority Data

Sep. 19, 1978 [GB] United Kingdom ............... 37336/78

[51] Int. Cl.³ ...................... C01B 11/02; G01N 31/00
[52] U.S. Cl. .................................. 423/478; 23/230 A; 422/62; 422/111; 422/119; 422/129; 364/497; 364/500; 364/502
[58] Field of Search ................ 423/478; 364/497, 500, 364/502; 23/230 A; 422/62, 111, 119

[56] References Cited

U.S. PATENT DOCUMENTS

| 3,242,327 | 3/1966 | Burk ..................................... 364/497 |
| 3,256,902 | 6/1966 | Porter ................................... 364/502 |
| 3,265,873 | 8/1966 | Sawyer ................................. 364/497 |
| 3,372,023 | 3/1968 | Krainer ................................ 364/497 |
| 3,377,158 | 4/1968 | Meyer .................................. 364/497 |
| 3,591,783 | 7/1971 | Zumwalt ........................... 23/230 A |
| 3,751,644 | 8/1973 | Mayer .................................. 364/497 |
| 3,760,168 | 9/1973 | Boyd .................................... 364/500 |
| 3,852,033 | 12/1974 | Hultman ........................... 23/230 A |
| 3,854,876 | 12/1974 | Rankine ............................ 23/230 A |
| 3,960,500 | 6/1976 | Ross ....................................... 422/62 |
| 4,086,328 | 4/1978 | Swindells ............................. 423/478 |

FOREIGN PATENT DOCUMENTS 598843  3/1978  U.S.S.R. .................................. 423/605

Primary Examiner—Brian E. Hearn
Attorney, Agent, or Firm—Sim & McBurney

[57] ABSTRACT

An automatic continuous monitoring system for a chlorine dioxide generating process (10) which produces a gaseous mixture of chlorine dioxide and chlorine (12) is described. The automatic system eliminates the need for periodic manual analysis of the off-gas stream and enables changes in the process efficiency to be rapidly compensated for. The system preferably utilizes a gas-liquid chromatograph analyzer (36) to analyze the off-gases from the generator (10) and to provide signals (42, 44) corresponding to the measured amounts of chlorine dioxide and chlorine. These signals then are converted (46) to a signal (47) corresponding to the ratio of chlorine dioxide and chlorine in the off-gas stream. The ratio then is converted to the efficiency (48). The efficiency value so obtained (49) may be compared with a previously determined value and changes compensated for by catalyst and/or reactant feed variations.

12 Claims, 1 Drawing Figure

EFFICIENCY CONTROL SYSTEM FOR CHLORINE DIOXIDE PLANTS

FIELD OF INVENTION

The present invention is directed to the production of chlorine dioxide, and more particularly to the control of the efficiency of chlorine dioxide production.

BACKGROUND TO THE INVENTION

In U.S. Pat. No. 3,864,456 assigned to the assignee of this application, there is described a process for the production of chlorine dioxide which involves the reduction of sodium chlorate in an aqueous acid reaction medium which is maintained at its boiling point at the absolute pressure thereon while a subatmospheric pressure is applied to the reaction zone in which the reaction medium is located. The boiling temperature is greater than about 30° C. and below the temperature above which substantial decomposition of chlorine dioxide occurs, preferably about 60° to about 80° C.

The reducing agent is chloride ions provided by added sodium chloride, hydrogen chloride or a mixture of the two while the acid is provided either wholly by sulphuric acid in the case where sodium chloride alone is used as the source of chloride ions or partly by sulphuric acid and partly by hydrochloric acid in the case where hydrogen chloride alone or in admixture with sodium chloride is used as the source of chloride ions.

The process operates on a continuous basis with reactants being continuously fed to the reaction medium and a gaseous mixture of chlorine dioxide, chlorine and water vapor being continuously removed from the reaction zone. The reaction medium is maintained at a total acid normality in the range of about 2 to about 4.8 normal and anhydrous neutral sodium sulphate is continuously crystallized from the reaction medium, once saturation is reached after start up. The crystallized sodium sulphate is removed from the reaction zone on a continuous or intermittent basis.

The just-described chlorine dioxide-producing process is commercially advantageous in that chlorine dioxide generation, water evaporation and by-product crystallization occur in the same vessel, anhydrous neutral sodium sulphate is formed directly, and a low total acid normality is employed. These and other qualities have led to wide commercial acceptance and implementation of the process.

It is known from U.S. Pat. No. 3,563,702 to increase the efficiency of production of chlorine dioxide by the above-described process from about 90 to 92% to about 97 to 98% by the use of certain catalysts, and silver salts commonly are used in commercial practice.

By the term "efficiency" is meant the degree of conversion of sodium chlorate fed to the reaction medium to produce chlorine dioxide. The chlorine dioxide-producing reaction is represented by the following equation (1):

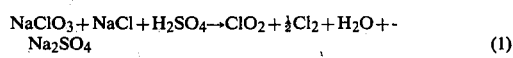

(1)

There is a competing reaction which produces no chlorine dioxide and this reaction is represented by the following equation (2):

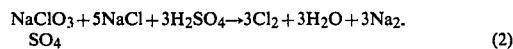

(2)

The efficiency of the process, therefore, is the extent to which the reaction of equation (1) can be made to predominate over the reaction of equation (2).

Since any decrease in efficiency of the process means that lesser quantities of sodium chlorate are converted to the desired chlorine dioxide product, and since sodium chlorate and silver salts are expensive raw materials, it is desirable to maintain the efficiency at as high a level as possible at all times. A number of factors can affect the efficiency of the process, mainly catalyst concentration and, to a lesser degree, mole ratio of chlorate ion to chloride ion in the reaction medium and temperature and acidity of the reaction medium.

In continuous plant operations, manual determinations of efficiency are effected to ensure operation at the desired efficiency level, any decrease in efficiency usually being compensated for by the addition of further quantities of catalyst, usually a silver salt, to the generator. Two types of determinations may be made, one based on the quantity of chlorate consumed and the quantity of chlorine dioxide produced. This determination provides an efficiency expressed as a percentage, signifying the percentage of one mole of chlorate which is reacted by equation (1) to form chlorine dioxide. This efficiency determination is only rarely made when a mass balance of the system is required, the chlorate feed and chlorine dioxide product values being monitored over the time interval and the determination being made from these monitored values.

The other manual determination which is made is the Gram Atom Percent Chlorine Dioxide (GA% ClO$_2$) value of the product stream. GA% ClO$_2$ is determined from the following equation (3):

$$GA\% \ ClO_2 = \frac{Cl \ in \ ClO_2}{Cl \ in \ ClO_2 + Cl \ in \ Cl_2} \times 100 \qquad (3)$$

by determining the chlorine atoms present in the product gas stream as chlorine dioxide and chlorine.

The GA% ClO$_2$ value is an accurate representation of the chemical efficiency and 100% efficiency is reached at a GA% ClO$_2$ value of 50%. This value is a valid determination of efficiency of the above-described process since chlorine is produced along with the chlorine dioxide and is present in the product gas stream, in contrast to some chlorine-dioxide-producing processes wherein the chlorine is reduced in situ to form chloride ions and the GA% ClO$_2$ value would not represent a true indication of efficiency.

The determination of efficiency as the GA% ClO$_2$ value is simpler to effect than the determination based on measurements of chlorate consumed and chlorine dioxide formed, requiring the withdrawal of a sample of product gas and analysis of the sample, generally by wet chemical means, to determine chlorine dioxide and chlorine contents. The GA% ClO$_2$ determination, however, is made at widely-spaced time intervals typically varying from once a shift to once a week. However, the product gas stream is at a high temperature and under subatmospheric pressure and operator skill is required to collect a representative sample for analysis.

Owing to the necessity for skilled operation and the problem of representative sample collection, the GA% ClO$_2$ efficiency value determined may be incorrect. Further, variations in efficiency between the periodic determinations are not compensated for. As a result, the overall efficiency of the chlorine dioxide producing process on a long term basis may well be, and usually is, less than the optimum, leading to less overall chlorine dioxide production and increased chemical and catalyst usage than the optimum.

In large volume chlorine dioxide generators, the system is less sensitive to changes in conditions, such as, chloride to chlorate mole ratio and catalyst concentration in the reaction medium and temperature, than in smaller volume generators having the same chlorine dioxide production capacity. In view of the fabricating costs of chlorine dioxide generators, which are generally constructed of titanium, the trend is to smaller volume generators, which leads, as noted above, to greater sensitivity of the process to parameter variations.

For greater overall efficiency and increased chlorine dioxide production and hence decreased raw material costs in the form of sodium chlorate and catalyst, it is necessary to provide a continuous accurate and rapid determination of efficiency so that all variations in efficiency can be compensated for.

SUMMARY OF INVENTION

The present invention is directed to a continuous monitoring system for a chlorine dioxide generating process which produces chlorine dioxide and chlorine by reduction of sodium chlorate with added chloride ions in the substantial absence of reducing agents for the chlorine. The monitoring system determines efficiency continuously by analysis of the product gas stream so that close control of the operating parameters of the process may be effected. In this way, the human error possibilities of a manual system based on chemical analysis of product gas stream sample are avoided, the difficulties resulting from the periodic manual determinations are eliminated, and an overall improvement in efficiency, increased chlorine dioxide production, and decreased chemical and catalyst usage results are realized.

In the present invention, the following operations are effected on a continuous cyclic basis. A sample of product gas stream containing chlorine dioxide and chlorine is machine analyzed, preferably chromatographically, to provide two separate signals, one indicative of the quantity of chlorine dioxide present in the sample and the other indicative of the quantity of chlorine present in the sample. The signals are machine converted to a signal indicative of the mole ratio of chlorine dioxide and chlorine present in the sample, and the chemical efficiency is computed from the mole ratio signal by use of the equation:

$$\text{Efficiency} = \frac{6R}{2 + 5R}$$

where R is the mole ratio of chlorine dioxide to chlorine in the sample.

The signal indicative of the efficiency determination is recorded. The recorded efficiency may be represented visually so that an operator can readily detect a decrease in efficiency for which he can compensate, usually by the addition of further quantities of catalyst to the reaction medium, or possibly by variation of other parameters. Alternatively, the recorded efficiency can be compared with previous determinations electronically and any variations can be compensated for by signal adjustment of catalyst flow valve setting or other feed chemical valve setting.

GENERAL DESCRIPTION OF INVENTION

Figure 1:
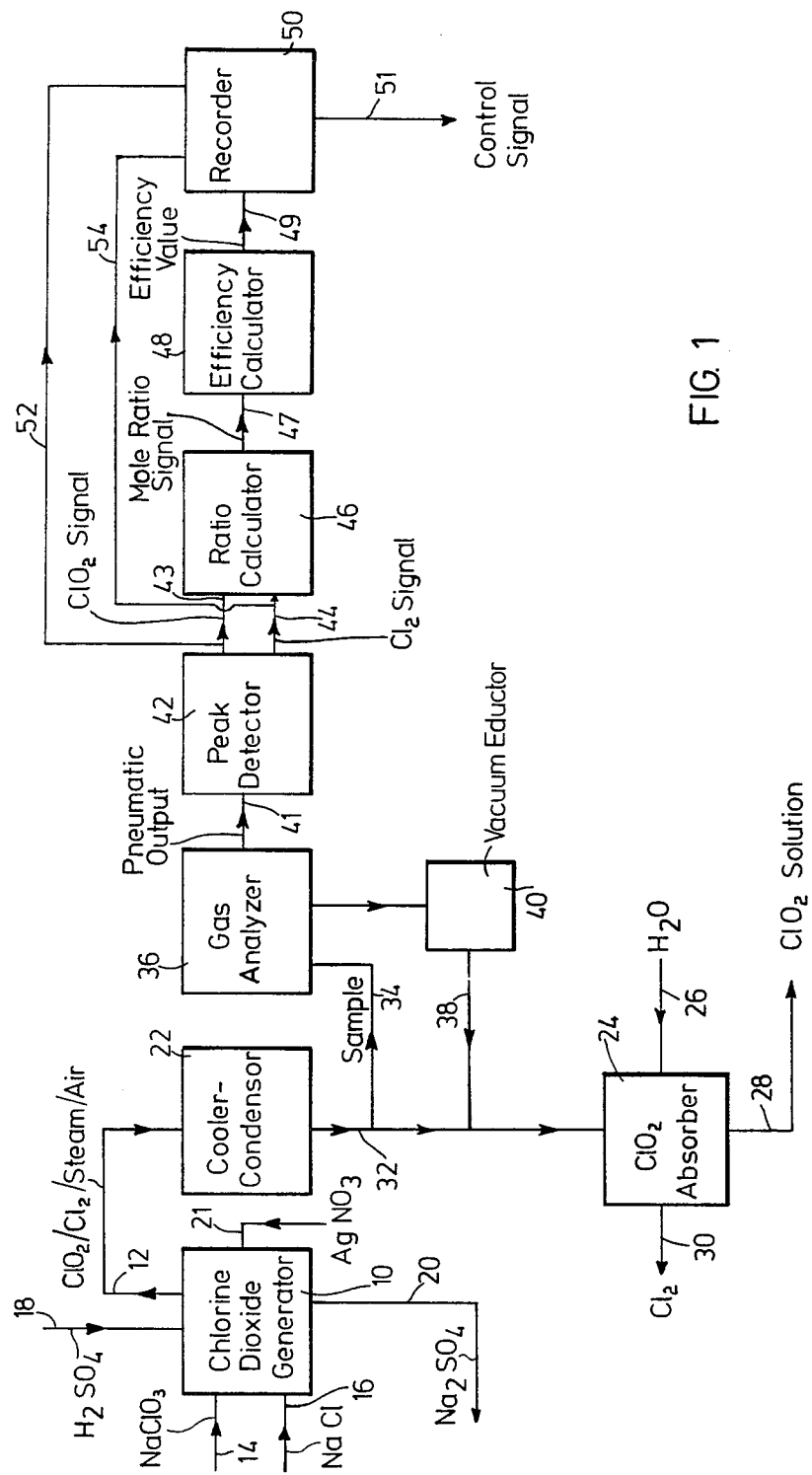
FIG. 1 is a schematic flow sheet of a preferred embodiment of the invention.

As noted previously, the chemical efficiency of a chlorine dioxide generating process is given by the ratio:

$$\text{Efficiency } (E) = \frac{\text{moles of chlorine dioxide formed}}{\text{moles of sodium chlorate consumed}} \times 100\%$$

If the ratio of chlorine dioxide to chlorine in the product gas stream from a chlorine dioxide generator is represented by R and if the quantity of sodium chlorate consumed by the reaction of equation (1) is represented by y, then, based on equations (1) and (2) above, for each mole of sodium chlorate consumed:

$$R = \frac{y}{y/2 + 3(1 - y)} = \frac{2y}{6 - 5y}$$

from which it follows that:

$$y = \frac{6R}{2 + 5R} = \frac{E}{100} \qquad (4)$$

Therefore, if the mole ratio of chlorine dioxide to chlorine in the product gas mixture is determined, then the chemical efficiency may be calculated from equation (4).

While the invention has particular applicability to the process of U.S. Pat. No. 3,864,456, and will be described below with reference thereto, the invention is applicable to any chlorine dioxide generating process wherein chlorate is reduced with added chloride ions as the sole reducing agent. Further, while the invention has particular applicability to the control of chlorine dioxide-producing processes in which a gaseous mixture of chlorine dioxide, chlorine and evaporated water vapor is formed and the generator is maintained under a subatmospheric pressure, the invention may be used with processes which utilize atmospheric pressure and added diluent gas.

One particular chlorine dioxide-producing process to which the present invention may be applied is that described in U.S. Pat. Nos. 3,929,974 and 4,075,308, assigned to the assignee of this application, wherein hydrogen chloride provides both the chloride ion reducing agent for the sodium chlorate and the acidity. In the latter process, operated at the boiling point of the reaction medium under a subatmospheric pressure, the by-product precipitated in the reaction vessel is sodium chloride. The acidity, expressed as actual hydrogen ion concentration, in this process is about 0.05 to about 0.3 normal.

DESCRIPTION OF PREFERRED EMBODIMENT

Referring to FIG. 1, there is disclosed therein the presently-preferred embodiment of the invention. A chlorine dioxide generator 10 produces a gaseous mixture of chlorine dioxide, chlorine and steam in line 12 from an aqueous acid reaction medium operating in accordance with U.S. Pat. No. 3,864,456 mentioned above, namely, under a subatmospheric pressure and at the boiling point of the reaction medium in the generator 10 under the absolute pressure thereon. An air bleed is provided corresponding to the subatmospheric pressure and gives rise to the presence of small amounts of air in the product gas stream 12.

Sodium chlorate, sodium chloride and sulphuric acid are fed to the generator vessel 10 by lines 14, 16 and 18 respectively, in any convenient manner, for example, as described in U.S. Pat. No. 3,895,100 assigned to the assignee of this application. A total acid normality of about 2 to about 4.8 normal, preferably about 2 to about 4.4 normal, is maintained in the reaction medium and anhydrous neutral sodium sulphate precipitates therefrom and is removed, on a continuous or intermittent basis, by line 20.

A silver salt is fed intermittently or continuously into the generator 10 by line 21 to provide catalyst to the generator 10 as required to maintain the efficiency of the chlorine dioxide production at the desired level. Any other convenient catalyst may be used, or may be omitted entirely if the decreased efficiency resulting therefrom can be tolerated or if the chlorine dioxide-producing process is an inherently-efficient one.

The product gas stream in line 12 is cooled in an indirect cooler-condenser 22 to cause condensation of the bulk of the steam and the condensed water. In the cooler-condenser 22, some of the chlorine dioxide and chlorine are dissolved in the condensed water and are compensated for in the efficiency determinator described in detail below. The output temperature of the cooler-condenser 22 usually is controlled to maintain the error a constant one.

The remaining gaseous phase is forwarded to a chlorine dioxide absorber tower 24 wherein the chlorine dioxide, along with some of the chlorine, is dissolved in water fed by line 26 to form a product chlorine dioxide solution stream 28, which may be used in bleach plant operations for the bleaching of wood pulp, and a chlorine gas stream 30, which then may be further processed in known manner.

Samples of the vapor phase are taken at closely-spaced time intervals from line 32 after the cooler-condenser 22 by line 34 to a gas analyzer 36 in the form of a gas-liquid chromatograph. Each sample, after analysis, is returned to the main gaseous phase line 32 by line 38 in which a small water ejector 40 or suitable vacuum inducing means is located for drawing the sample through the chromatograph 36 by exerting a greater subatmospheric pressure than exists in line 32.

This arrangement enables samples to be readily withdrawn from the high temperature subatmospheric pressure vapor phase for analysis and avoid the prior art necessity for skilled operator withdrawal of a representative sample.

The chromatograph 36 analyzes the incoming sample gas stream and provides a pneumatic output 41 to a detector unit 42 which detects pressure peaks in the pneumatic output 41 corresponding to the chlorine dioxide and chlorine of the sample, measures the height of each such peak above a baseline which is equivalent to the concentration of chlorine dioxide and chlorine respectively in the sample and transmits two separate pneumatic or other signals, depending on the form of the detector 42, and corresponding respectively to the analyzed quantities of chlorine dioxide and chlorine in the gas sample, and therefore corresponding to the quantities of these gases present in the condensed stream 32.

Any convenient analyzer 31 and detector 42 capable of achieving the above-described functions and providing the required output signals may be used. One suitable instrument which combines these operations is that known as the Model 91 PCT Analyzer sold by the Foxboro Company, Foxboro, Mass., U.S.A.

The pneumatic signals 43 and 44 respectively are forwarded from the peak detector 42 to a mole ratio calculator 46 wherein the signals are converted to a signal representative of the ratio of the molar amounts of chlorine dioxide and chlorine in the sample stream 34.

The conversion of the absolute values of chlorine dioxide and chlorine as measured by the peak detector 42 to a molar ratio thereof is important in that the conversion eliminates any zero drift and peak height variations which may be caused by variations in analyzer characteristics, such as, chromatograph absorbent characteristics, and temperature and pressure variations in the chromatograph unit.

The mole ratio signal in line 47 then is converted to the efficiency represented by the mole ratio signal in an efficiency calculator 48. The efficiency calculator 48 may take any convenient form to effect the efficiency calculation based on the equation (4):

$$y = \frac{6R}{2 + 5R} \times 100\%$$

where y is the efficiency and R is the mole ratio.

The efficiency value in line 49 then is recorded by a recorder 50 of any convenient form, such as, a pen recorder. The efficiency value so obtained represents the chemical efficiency of conversion of chlorate to chlorine dioxide in the generator 10 at the moment the gas sample was taken.

As the individual samples were taken, corresponding efficiency values are recorded by the recorder 50. An operator can recognize a trend towards decreased efficiency by observation of the penned recording. Catalyst then is fed by line 21 to the generator to restore the efficiency to its desired level.

Alternatively, the recorder 50 may be provided with an alarm output 51 which is activated when the recorded efficiency drops to a predetermined value to alert an operator to the necessity for catalyst addition.

Where the chlorine dioxide process is one in which a catalyst is not used, the operator may vary other operating parameters, such as, reactant flows, to restore the desired efficiency.

In addition to, or alternative to, a visual readout of the determined efficiency, the recorder 50 may activate automatic feed of catalyst and/or other generator feeds to compensate for an undesirable fall in the efficiency, whereby the efficiency control is completely automatic and requires no operator activity.

At times it may be desired to operate intentionally at less than optimum efficiency when greater quantities of chlorine are required. The efficiency determinations may be used to maintain such an operation and indeed to maintain the individual productions of chlorine dioxide and chlorine at any desired levels.

The individual signals in line 43 and 44 may be independently recorded by recorder 50, as signified by lines 52 and 54, respectively, so that calibration of the recorded efficiency values may be effected by independent calculation from the recorded chlorine dioxide and chlorine values.

A gas-liquid chromatograph is not essential to the invention and any convenient gas analyzer may be used. Further, pneumatic processing of the detector output signals is not essential and any other convenient procedure may be used, such as, electronic.

The system discussed above with reference to FIG. 1, is desired, may be used to make efficiency determinations at widely-spaced time intervals, e.g., daily or twice daily, to determine long term variations in efficiency, in place of similarly-effected widely-spaced time interval manual determinations of GA% ClO$_2$ values. However, the major benefit of the system lies in its ability to effect continuous monitoring of the efficiency of the chlorine dioxide generator 10 by taking samples as often as the chromatograph is capable of handling the same, for example, every 3 to 5 minutes.

By continuously monitoring the efficiency of chlorine dioxide generation in this way, significantly closer control of variations in efficiency of the process can be effected, as compared to the prior art discontinuous manual procedure, and hence an overall more efficient operation and an increased chlorine dioxide production are realized with consequential savings in raw material costs. These results are particularly significant in the smaller-sized generators currently used, in view of their greater sensitivity to parameter variations, as mentioned above.

SUMMARY OF DISCLOSURE

In summary of this disclosure, the present invention is directed to improvements in chlorine dioxide production processes by continuous monitoring of the efficiency of the system and making adjustments accordingly. Modifications are possible within the scope of the invention.

What we claim is:

1. In a continuous process for the production of chlorine dioxide by reducing chlorate ions with chloride ions in the substantial absence of any reducing agent for chlorine and in an aqueous acid reaction medium to form a product gas stream containing chlorine dioxide and chlorine, the improvement which comprises controlling the efficiency of chlorine dioxide production by varying at least one efficiency-modifying operating parameter of the process in response to continuous determinations of chlorine dioxide production efficiency by repetitive operations of:
   (a) machine generating separate signals corresponding to the concentration of chlorine dioxide and chlorine respectively in the product gas stream;
   (b) machine converting the generated separate signals into a signal corresponding to the mole ratio of chlorine dioxide to chlorine in the product gas stream;
   (c) machine converting the mole ratio signal into a signal corresponding to the efficiency of the process by machine computation from the equation:

$$\text{Efficiency} = \frac{6R}{2 + 5R} \times 100\%$$

where R is the mole ratio; and
   (d) machine recording the efficiency signal.

2. The process of claim 1 wherein the repetitive operations are effected on successive samples withdrawn from the product gas stream.

3. The process of claim 2 wherein the product gas stream exerts a subatmospheric pressure, the successive samples are withdrawn from the product gas stream by the application of the product gas stream of a subatmospheric pressure greater than the subatmospheric pressure of the product gas stream, and, following analysis thereof, are returned to the product gas stream downstream of the withdrawal.

4. The process of claim 3, wherein the samples are analyzed chromatographically and the separate concentration signals are generated from the analysis.

5. The process of claim 1, 2, 3, or 4 wherein said acid and said chloride ions are provided by hydrogen chloride, said chlorate ions are provided by sodium chlorate, said reaction medium has an actual hydrogen ion concentration of about 0.05 to about 0.3 normal, and the reduction of chlorate ions with chloride ions is effected at the boiling point of the reaction medium under a subatmospheric pressure.

6. The process of any of claims 1, 2, 3 or 4, wherein the reduction of chlorate ions with chloride ions is effected at the boiling point of the reaction medium under a subatmospheric pressure and is effected in the presence of at least one chlorine dioxide-producing efficiency-improving catalyst, and chlorine dioxide production efficiency variation is effected by addition of controlled quantities of the catalyst to the reaction medium in response to decreased recorded efficiency.

7. The process of claim 6 wherein at least a substantial proportion of the steam contained in said product gas stream is condensed prior to said separate signal generation.

8. The process of claim 7 wherein said acid includes sulphuric acid, said chloride ions are provided by sodium chloride and/or hydrogen chloride, said chlorate ions are provided by sodium chlorate, the reaction medium has a total acid normality of about 2 to about 4.8 normal and neutral anhydrous sodium sulphate is precipitated from the reaction medium.

9. The process of claim 8, wherein said catalyst is silver ions.

10. Apparatus for the production of chlorine dioxide by a chlorine dioxide producing process wherein chlorate ions are reduced with chloride ions in the substantial absence of any reducing agent for chlorine and in an acid aqueous reaction medium to form a product gas stream containing chlorine dioxide and chlorine whereby the efficiency of chlorine dioxide production is controlled by varying at least one efficiency-modifying parameter of the process in response to continuous determinations of chlorine dioxide efficiency, comprising:
   (a) chlorine dioxide generator means containing said acid aqueous reaction medium and having outlet means for removal of said product gas stream from said generator means;
   (b) product gas analysis and signal generator means for sampling the removal product gas stream and generating separate signals indicative of the concentrations of chlorine dioxide and chlorine respectively in the sample;
   (c) converter means for converting the separate concentration signals to a signal indicative of the mole ratio of chlorine dioxide to chlorine in the sample;
   (d) efficiency calculating means for producing a signal corresponding to the efficiency of conversion of chlorate ions to chlorine dioxide in the process from the mole ratio signal by computation from the equation:

$$\text{Efficiency} = \frac{6R}{2 + 5R} \times 100\%$$

wherein R is the mole ratio;

(e) recording means for recording the efficiency value, said recorder means including comparator means for comparing the recorded efficiency with previously-recorded values thereof and for generating a control signal in response to predetermined variations in recorded efficiency values; and (f) means for utilizing said control signal to effect said variation of at least one efficiency-modifying parameter of the chlorine dioxide producing process effected in said chlorine dioxide generator means.

11. The apparatus of claim 10 wherein said product gas analysis and signal generating means includes gas-liquid chromatograph analyzer means.

12. The apparatus of claim 10 wherein said product gas analysis and signal generating means and said converter means produce pneumatic signals.

* * * * *